Aug. 27, 1929.  J. W. ERHARD ET AL  1,726,390
COMBINATION COMB AND SCISSORS
Filed Nov. 17, 1927
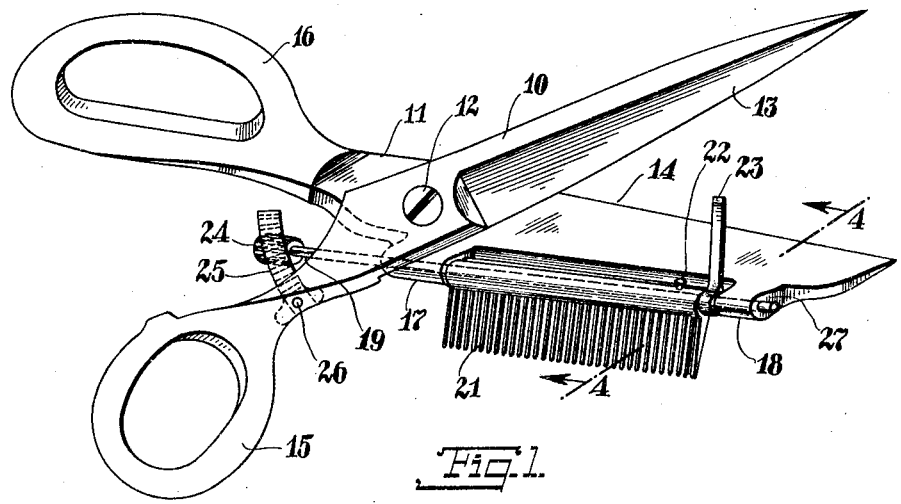
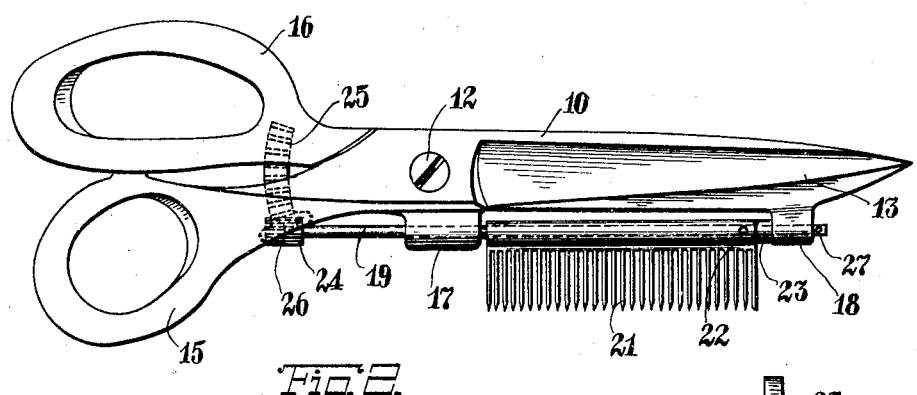
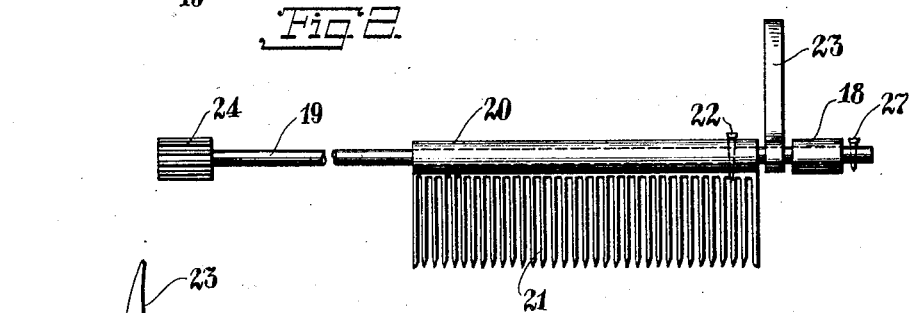
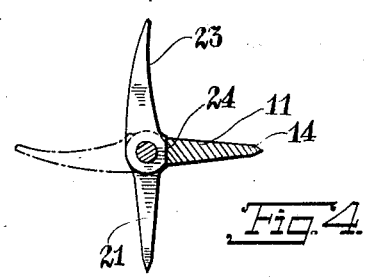
INVENTORS
John W. Erhard
Antoinette Erhard
BY
ATTORNEY Patented Aug. 27, 1929.

1,726,390

UNITED STATES PATENT OFFICE.

JOHN W. ERHARD AND ANTOINETTE ERHARD, OF NEW YORK, N. Y.

COMBINATION COMB AND SCISSORS.

Application filed November 17, 1927. Serial No. 233,834.

This invention relates to a new and useful device in the nature of a combination comb and scissors, adapted for the purpose of combing and cutting hair, and embodying a gauge as a means of determining the length of the hair which is cut off.

The object of the invention is to provide a combination comb and scissors of novel construction and arrangement of parts hereinafter more fully described, claimed and illustrated in the accompanying drawing.

Fig. 1, is a perspective view of our improved device showing the scissors in an open position.

Fig. 2, is a top plan view thereof, showing the scissors in closed position.

Fig. 3, is a detail view of the comb, hair gauge and connected mechanism, detached from the scissors.

Fig. 4, is a transverse sectional view taken on the line 4—4 of Fig. 1.

As here embodied our improved device comprises a pair of scissors, such as generally used for cutting hair, and which consists of a pair of shear members 10 and 11, pivotally secured, or hinged, intermediately, as at 12. The shear members 10 and 11, are provided in the cutting edges 13 and 14, respectively, and handle elements 15 and 16, respectively, the above described construction being common to scissors, as above set forth.

The shear member 11, is provided with lug elements 17 and 18, extended at the rear of the cutting edge 14, in proximity to the pivot 12 and the extremity of the cutting edge 14, respectively. The lug elements 17 and 18, have formed therein apertures adapted to receive the rod 19.

The comb 20, is provided with the usual teeth 21, and has formed therein a longitudinal aperture adapted to receive the rod 19, and is secured thereto by means of a pin 22, the said comb being positioned on the rod 19 intermediate the lug elements 17 and 18. The gauge 23, has formed therein, at one extremity thereof, an aperture adapted to freely receive the rod 19, and is provided with a somewhat extended portion 24, adapted to engage or contact with the shear member 11, at the rear of the cutting edge 14, so as to hold the said gauge in an extended position, upwardly, approximately a right angle to the shear member 11, the said gauge being positioned on the rod 19, intermediate the comb 20, and the lug element 18.

The rod 19, is provided with an enlarged extremity 24, having cut or formed therein gear teeth, so as to provide a pinion, adapted to mesh with the rack 25, of arc shaped construction, secured, at one extremity, as at 26, to the shear member 10, in proximity to the handle element 15, the pinion 24, being held in mesh with the rack 25, by means of the pin 27, mounted in the rod 19, adjacent to the lug element 18.

The above described construction being such as will permit the teeth 21 of the comb 20, to be extended downwardly, at approximately a right angle to the shear member 11, when the scissors are in an open position, as clearly shown in Fig. 1, and which will permit the said comb to be partially rotated, approximately through an angle of 90°, when the said scissors are in a closed position, as clearly shown in Fig. 2.

It being understood that the gauge 23, will be held in a fixed position.

It is obvious from the foregoing description that the comb 20, may be used to comb the hair, prior to the cutting of the hair, when the scissors are held in an opening position, and that when the hair thus combed, is cut that the comb will partially rotate, as above set forth, which will prevent the comb from interfering with the cutting of the hair.

It is also obvious that the gauge 23, may be used to gauge or determine the length of the hair that is cut off.

While we have above described the preferred form, construction and arrangements of the several elements employed, it will be understood that the device is, nevertheless, susceptible of considerable modification therein, and we therefore reserve the privilege of resorting to all such changes as may be fairly embodied within the spirit and scope of the invention as claimed.

Having thus described our invention, what we claim as new and desire to protect by Letters Patent of the United States is as follows:—

1. A combination comb and scissors, comprising a pair of scissors consisting of two shear members pivotally connected, lugs projecting from one of the shear members, a rod with a comb fixed thereon, rotatively mounted in the said lugs, a pinion fixed on the rod, and a rack secured on the other shear member and meshing with the said pinion for partially rotating the comb upon opening and closing of the scissors.

2. A combination comb and scissors, comprising a pair of scissors consisting of two shear members pivotally connected, lugs projecting from one of the shear members, a rod with a comb fixed thereon, rotatively mounted in the said lugs, a pinion fixed on the rod, a rack secured on the other shear member and meshing with the said pinion for partially rotating the comb upon opening and closing of the scissors, and a gauge freely mounted on the said rod and extended therefrom, and capable of being held in a fixed position.

3. A combination comb and scissors, comprising a pair of scissors consisting of two shear members pivotally connected, a rod with a comb fixed thereon, rotatively mounted on one of the shear members, a pinion fixed on the rod, and a rack secured on the other shear member and meshing with the said pinion for partially rotating the comb upon opening and closing of the scissors.

In testimony whereof we have affixed our signatures.

JOHN W. ERHARD.
ANTOINETTE ERHARD.